United States Patent
Russo et al.

(10) Patent No.: US 7,885,436 B2
(45) Date of Patent: Feb. 8, 2011

(54) SYSTEM FOR AND METHOD OF ASSIGNING CONFIDENCE VALUES TO FINGERPRINT MINUTIAE POINTS

(75) Inventors: Anthony P. Russo, New York, NY (US); Wayne Yang, Campbell, CA (US)

(73) Assignee: Authentec, Inc., Melbourne, FL (US)

( * ) Notice: Subject to any disclaimer, the term of this patent is extended or adjusted under 35 U.S.C. 154(b) by 0 days.

(21) Appl. No.: 11/825,412

(22) Filed: Jul. 5, 2007

(65) Prior Publication Data
US 2008/0013808 A1 Jan. 17, 2008

Related U.S. Application Data

(60) Provisional application No. 60/830,768, filed on Jul. 13, 2006.

(51) Int. Cl.
G06K 9/00 (2006.01)
G06T 1/00 (2006.01)
G06T 7/00 (2006.01)

(52) U.S. Cl. .............. 382/124; 382/115; 340/5.53; 340/5.83

(58) Field of Classification Search ......... 382/115–117, 382/209–223, 293–297; 283/68, 69, 73, 283/78; 356/71; 340/825.34, 5.1–5.2; 250/556; 713/186
See application file for complete search history.

(56) References Cited

U.S. PATENT DOCUMENTS

| | | | | |
|---|---|---|---|---|
| 5,283,735 A | 2/1994 | Gross et al. | ............ | 364/413.02 |
| 5,327,161 A | 7/1994 | Logan et al. | ................ | 345/157 |
| 5,610,993 A * | 3/1997 | Yamamoto | .................. | 382/124 |
| 5,612,719 A | 3/1997 | Beernink et al. | ............ | 345/173 |
| 5,666,113 A | 9/1997 | Logan | ........................ | 341/34 |
| 5,689,285 A | 11/1997 | Asher | ........................ | 345/161 |
| 5,740,276 A | 4/1998 | Tomko et al. | ............... | 382/210 |
| 5,825,352 A | 10/1998 | Bisset et al. | ................ | 345/173 |
| 5,825,907 A | 10/1998 | Russo | ........................ | 382/124 |
| 5,862,248 A | 1/1999 | Salatino et al. | ............. | 382/124 |
| 5,909,211 A | 6/1999 | Combs et al. | ............... | 345/172 |
| 5,940,526 A | 8/1999 | Setlak et al. | ................ | 382/124 |

(Continued)

FOREIGN PATENT DOCUMENTS

JP     2000-056877 A     2/2000

OTHER PUBLICATIONS

X.D. Jiang, W.Y. Yau and W. Ser, "Detecting the Fingerprint Minutiae by Adaptive Tracing the Gray Level Ridge," Pattern Recognition, vol. 34, pp. 999-1013, May 2001.*

(Continued)

*Primary Examiner*—Vu Le
*Assistant Examiner*—Andrae S Allison
(74) *Attorney, Agent, or Firm*—Allen, Dyer, Doppelt, Milbrath & Gilchrist, P.A.

(57) ABSTRACT

A method in accordance with the present invention is used to organize minutiae and other identifying characteristics of a patterned object to verify a user. In one embodiment, the method includes matching minutiae points of the patterned object in one more sets with minutiae points of the patterned object in a candidate set. The method also includes adjusting a confidence value of each minutia point in the one or more sets based on results of the matching. The method also includes organizing the one or more sets based on the confidence values, such as by ordering the minutiae in the one or more sets based on the confidence values, or by deleting from the one or more sets any identifying characteristics with a confidence value below a threshold.

27 Claims, 10 Drawing Sheets

U.S. PATENT DOCUMENTS

| | | | | |
|---|---|---|---|---|
| 5,963,679 | A | 10/1999 | Setlak | 382/312 |
| 5,995,084 | A | 11/1999 | Chan et al. | 345/173 |
| 5,995,623 | A | 11/1999 | Kawano et al. | 380/21 |
| 5,995,630 | A | 11/1999 | Borza | 380/54 |
| 6,011,849 | A | 1/2000 | Orrin | 380/42 |
| 6,035,398 | A | 3/2000 | Bjorn | 713/186 |
| 6,057,830 | A | 5/2000 | Chan et al. | 345/157 |
| 6,061,051 | A | 5/2000 | Chan et al. | 345/173 |
| 6,135,958 | A | 10/2000 | Mikula-Curtis et al. | 600/443 |
| 6,141,753 | A | 10/2000 | Zhao et al. | 713/176 |
| 6,208,329 | B1 | 3/2001 | Ballare | 345/173 |
| 6,219,793 | B1 | 4/2001 | Li et al. | 713/202 |
| 6,219,794 | B1 | 4/2001 | Soutar et al. | 713/202 |
| 6,248,655 | B1 | 6/2001 | Machida et al. | 438/597 |
| 6,259,804 | B1 | 7/2001 | Setlak et al. | 382/124 |
| 6,317,508 | B1 | 11/2001 | Kramer et al. | 382/124 |
| 6,330,345 | B1 | 12/2001 | Russo et al. | 382/115 |
| 6,408,087 | B1 | 6/2002 | Kramer | 382/124 |
| 6,518,560 | B1 | 2/2003 | Yeh et al. | 250/214 |
| 6,535,622 | B1 * | 3/2003 | Russo et al. | 382/124 |
| 6,546,122 | B1 * | 4/2003 | Russo | 382/125 |
| 6,601,169 | B2 | 7/2003 | Wallace, Jr. et al. | 713/151 |
| 6,661,631 | B1 | 12/2003 | Sabatini et al. | 361/93.1 |
| 6,667,439 | B2 | 12/2003 | Salatino et al. | 174/52.1 |
| 6,668,072 | B1 * | 12/2003 | Hribernig et al. | 382/124 |
| 6,681,034 | B1 * | 1/2004 | Russo | 382/125 |
| 6,744,910 | B1 | 6/2004 | McClurg et al. | 382/124 |
| 6,754,365 | B1 | 6/2004 | Wen et al. | 382/100 |
| 6,804,378 | B2 | 10/2004 | Rhoads | 382/100 |
| 6,876,756 | B1 | 4/2005 | Vieweg | 382/124 |
| 6,961,452 | B2 * | 11/2005 | Fujii | 382/125 |
| 7,002,553 | B2 | 2/2006 | Shkolnikov | 345/169 |
| 7,003,670 | B2 | 2/2006 | Heaven et al. | 713/186 |
| 7,020,270 | B1 | 3/2006 | Ghassabian | 379/368 |
| 7,054,470 | B2 | 5/2006 | Bolle et al. | 382/124 |
| 7,113,179 | B2 | 9/2006 | Baker et al. | 345/178 |
| 7,136,514 | B1 | 11/2006 | Wong | 382/124 |
| 7,197,168 | B2 * | 3/2007 | Russo | 382/125 |
| 7,263,212 | B2 * | 8/2007 | Kawabe | 382/124 |
| 7,280,679 | B2 | 10/2007 | Russo | 382/124 |
| 7,299,360 | B2 | 11/2007 | Russo | 713/182 |
| 7,339,572 | B2 | 3/2008 | Schena | 345/156 |
| 7,369,688 | B2 * | 5/2008 | Ser et al. | 382/124 |
| 7,474,772 | B2 | 1/2009 | Russo et al. | 382/124 |
| 2001/0017934 | A1 | 8/2001 | Paloniemi et al. | 382/107 |
| 2002/0130673 | A1 | 9/2002 | Pelrine et al. | 324/727 |
| 2002/0186203 | A1 | 12/2002 | Huang | 345/157 |
| 2002/0188854 | A1 | 12/2002 | Heaven et al. | 713/186 |
| 2003/0002718 | A1 | 1/2003 | Hamid | 382/124 |
| 2003/0021495 | A1 | 1/2003 | Cheng | 382/312 |
| 2003/0028811 | A1 | 2/2003 | Walker et al. | 713/202 |
| 2003/0044051 | A1 | 3/2003 | Fujieda | 382/124 |
| 2003/0115490 | A1 | 6/2003 | Russo et al. | 713/202 |
| 2003/0123714 | A1 | 7/2003 | O'Gorman et al. | 382/124 |
| 2003/0126448 | A1 | 7/2003 | Russo | 713/186 |
| 2003/0135764 | A1 | 7/2003 | Lu | 713/202 |
| 2003/0214481 | A1 | 11/2003 | Xiong | 345/157 |
| 2004/0014457 | A1 | 1/2004 | Stevens | 455/411.1 |
| 2004/0128521 | A1 | 7/2004 | Russo | 713/186 |
| 2004/0148526 | A1 | 7/2004 | Sands et al. | 713/202 |
| 2004/0156538 | A1 | 8/2004 | Greschitz et al. | 382/124 |
| 2004/0186882 | A1 | 9/2004 | Ting | 709/202 |
| 2004/0208348 | A1 | 10/2004 | Baharav et al. | 382/124 |
| 2004/0252867 | A1 | 12/2004 | Lan et al. | 382/124 |
| 2004/0258282 | A1 | 12/2004 | Bjorn et al. | 382/124 |
| 2004/0263479 | A1 | 12/2004 | Shkolnikov | 345/169 |
| 2005/0012714 | A1 | 1/2005 | Russo et al. | 345/157 |
| 2005/0041885 | A1 | 2/2005 | Russo | 382/289 |
| 2005/0144329 | A1 | 6/2005 | Tsai et al. | 710/1 |
| 2005/0169503 | A1 | 8/2005 | Howell et al. | 382/115 |
| 2005/0179657 | A1 | 8/2005 | Russo et al. | 345/163 |
| 2005/0259851 | A1 | 11/2005 | Fyke | 382/124 |
| 2005/0259852 | A1 | 11/2005 | Russo | 382/124 |
| 2006/0002597 | A1 | 1/2006 | Rowe | 382/124 |
| 2006/0034043 | A1 | 2/2006 | Hisano et al. | 361/681 |
| 2006/0078174 | A1 | 4/2006 | Russo | 382/121 |
| 2006/0103633 | A1 | 5/2006 | Gioeli | 345/173 |
| 2006/0242268 | A1 | 10/2006 | Omernick et al. | 709/219 |
| 2006/0280346 | A1 | 12/2006 | Machida | 382/124 |
| 2007/0014443 | A1 | 1/2007 | Russo | 382/124 |
| 2007/0016779 | A1 | 1/2007 | Lyle | 713/169 |
| 2007/0034783 | A1 | 2/2007 | Eliasson et al. | 250/221 |
| 2007/0038867 | A1 | 2/2007 | Verbauwhede et al. | 713/186 |
| 2007/0061126 | A1 | 3/2007 | Russo et al. | 703/24 |
| 2007/0067642 | A1 | 3/2007 | Singhal | 713/186 |
| 2007/0125937 | A1 | 6/2007 | Eliasson et al. | 250/221 |
| 2007/0146349 | A1 | 6/2007 | Errico et al. | 345/174 |
| 2007/0274575 | A1 | 11/2007 | Russo | 382/124 |

OTHER PUBLICATIONS

X.D. Jiang and W.Y. Yau "Fingerprint Minutiae Matching Based on the Local and Global Structures," Proc. 15.sup.th International Conference on Pattern Recognition, ICPR, Barcelona, Spain, vol. 2, pp. 1042-1045, Sep. 2000.*

Sasakawa et al., "Personal Verification System With High Tolerance of Poor Quality Fingerprints", The Transactions of the Institute of Electronics, Information and Communication Engineers, D-II, vol. J72-D-II, No. 5, pp. 707-714, May 1989.*

M. Irani and S. Peleg, "Improving Resolution by Image Registration", published in the journal CVGIP: Graphical Models and Image Processing, vol. 53, pp. 231-239, May 1991.*

C. Ryu, Y. Han and H. Kim, "Super-template Generation Using Successive Bayesian Estimation for Fingerprint Enrollment," Proc. AVBPA 2005, pp. 710-719, 2005.*

W. Yau, K. Toh and T. Chen, "Fingerprint Templates Combination," Proc. 5th Chinese Conference on Biometric Recognition, LNCS 3338, pp. 449-460, 2004.*

Lee, K. Choi, S. Lee and J. Kim, "Fingerprint Fusion Based on Minutiae and Ridge for Enrollment," Proc. AVBPA 2003, LNCS 2688, pp. 478-485, 2003.*

Zheng et al, "A computational vision approach to image registration", Image Processing, IEEE Transactions on Volume 2, Issue 3, Jul. 1993 pp. 311-326.*

X. Jiang and W. Yau, "Fingerprint minutiae matching based on the local and global structures," in: Proceedings of ICPR, Barcelona, 2000, pp. 1038-1041.*

Kyung Deok Yu, Sangsin Na, Tae Young Choi: A Fingerprint Matching Algorithm Based on Radial Structure and a Structure-Rewarding Scoring Strategy. AVBPA 2005: 656-664.*

"Handbook of Fingerprinting Recognition", Davide Maltoni et al., 2003 Springer Science Business Media, Inc., 8 pages.

"Learning Fingerprint Minutiae Location and Type", Salil Prabhakar et al., Sep. 3, 2000, 22 pages.

"A Minutia-Based Partial Fingerprint Recognition System", Tsai__Yang Jea and Venu Govindaraju, Center for Unified Biometrics and Sensors, University at Buffalo, State of University of New York, Amherst, NY USA 14228, 22 pages.

"NIST Fingerprint Image Quality", Eham Tabassi, Biometirc Consortium Conference, Sep. 20, 2005, 13 pages.

Criminal Justice Information Services (CJIS), "Electronic Fingerprint Transmission Specification", May 2, 2005, Prepared by Federal Bureau of Investigation, Criminal Justice Information Services Division, 1000 Custer Hollow Road, Clarksburg, WV 26306, 20 pages.

NIST Biometric Data Specification for Personal Identity Verification, Charles Wilson et al., Jan. 2007, 27 pages.

International Standard, ISO/IEC 19794-2, First Edition, Sep. 15, 2005, "Information Technology, Biometric Data Interchange Formats", Part 2: "Finer Minutiae Data", 40 pages.

* cited by examiner

| 520 | 525 |
|---|---|
| A | 44 |
| B | 48 |
| C | 0 |
| ⋮ | ⋮ |
| I | 18 |
| J | 32 |

Fig. 8B

SYSTEM FOR AND METHOD OF ASSIGNING CONFIDENCE VALUES TO FINGERPRINT MINUTIAE POINTS

RELATED APPLICATION

This application claims priority under 35 U.S.C. §119(e) of the co-pending U.S. provisional patent application Ser. No. 60/830,768, filed Jul. 13, 2006, and titled "System for and Method for Assigning Confidence Values to Fingerprint Minutia Points," which is hereby incorporated by reference.

FIELD OF THE INVENTION

This invention relates to biometric image processing. In particular, this invention relates to systems for and methods of assigning confidence values to identifying characteristics of a biometric object, such as fingerprints, using match results.

BACKGROUND OF THE INVENTION

Automated fingerprint processing is a mature art whose application rapidly is becoming more widespread. Fingerprint minutiae matching algorithms methodically compare minutiae points to determine whether two fingerprint templates match each other. Typically, these matching algorithms rely upon an analysis of the confidence of each individual minutia to improve performance or to reduce the computational complexity of the matching process by pruning out low confidence minutiae.

Prior art systems assign these minutiae confidence values by analyzing local and global properties of the image from which they were detected and extracted. These image properties are not tightly linked to the actual matching process and therefore do not always produce a reliable confidence value that predicts how likely a minutia point is to be matched in future verification attempts. It is the estimate of this likelihood that is most important when pruning or truncating the number of minutiae in a template.

Nothing in the prior art teaches assigning confidence values or pruning of individual templates.

SUMMARY OF THE INVENTION

The present invention assigns confidence values to individual minutiae in a fingerprint template by using the results of matching multiple templates to each other, where each template is created by scanning a different image of the same finger. Because the present invention relies on matching to estimate the probability of future matches, the results are very reliable and are an excellent predictor of the likelihood of a minutia point to be accurately matched in future verification or identification attempts. Another advantage of this method is that the confidence values can be re-evaluated, and made more reliable, with additional minutia template data and without having access to the original fingerprint image. This is not possible using prior art systems.

In a first aspect of the present invention, a method is used to organize identifying characteristics of a patterned object used to verify the patterned object. The method includes matching identifying characteristics of the patterned object in one or more sets with identifying characteristics of the patterned object in a candidate set. The method also includes adjusting a confidence value of each identifying characteristic in the one or more sets based on results of the matching, and organizing the one or more sets based on the confidence values.

The one or more sets are organized by ordering the identifying characteristics in the one or more sets based on the confidence values, by deleting from the one or more sets any identifying characteristics with a confidence value below a threshold, or both. In one embodiment, the threshold is predetermined. Alternatively, the threshold is dynamic.

In one embodiment, the identifying characteristics are fingerprint minutiae and the candidate set and the one or more sets each forms a template of fingerprint minutiae. In another embodiment, the identifying characteristics correspond to retinal minutiae and the candidate set and the one or more sets each forms a template corresponding to retinal minutiae. As used herein, "retinal minutiae" refer to blood vessel bifurcations, endings, and the like. In one embodiment, the method also includes adding the candidate set to the one or more sets.

In a second aspect of the present invention, a method of verifying a patterned object includes generating a template of candidate identifying characteristics from an image of the patterned object; matching the candidate identifying characteristics to stored identifying characteristics of the patterned object in one or more other templates, wherein the matches are performed based on confidence values associated with each of the stored identifying characteristics; and verifying the patterned object based on a result of the matches. As used herein, a "match" is an attempt to match characteristics, and results in either a "successful" or an "unsuccessful" match.

In one embodiment, the identifying characteristics are finger minutiae. In this embodiment, the method also includes reading the image of the patterned object using a finger sensor. In another embodiment, the identifying characteristics include retinal minutiae. In this other embodiment, the method also includes reading the image of the patterned object using a retinal scanner. The one or more other templates are generated from one or more images of the patterned object.

The candidate identifying characteristics are matched to the stored identifying characteristics in a manner based on the confidence values. Preferably, the manner is in an order from highest to lowest confidence values. The method also includes aligning a template of the candidate identifying characteristics with the one or more other templates, to thereby perform a more accurate match.

In a third aspect of the present invention, a method of generating templates corresponding to image data includes performing one or more pairwise matches of two or more templates each containing data corresponding to identifying characteristics, and assigning confidence values to each identifying characteristic in each of the two or more templates based on matches between the identifying characteristics.

In one embodiment, confidence values are assigned to an identifying characteristic by updating confidence values associated with the identifying characteristic by an incremental value. The incremental value depends on a type of match between identifying characteristics matched during the pairwise matches. The match is "unsuccessful match", "successful loose" match, "successful strict" match, a successful match within a bounding box, or a combination of these.

Preferably, each pairwise match includes a first stage that includes a loose or low-tolerance match, and a second stage that includes a strict or high-tolerance match.

In a fourth aspect of the present invention, an apparatus for assigning confidence values to identifying characteristics of a patterned object includes a template builder and an assignor. The template builder is configured to build templates of identifying characteristics. Each template contains a record mapping a confidence value to an associated identifying characteristic. The assignor is configured to assign confidence values to each of the identifying characteristics generated from a match of each of the identifying characteristics in a first template to identifying characteristics of the patterned object in one or more other templates. The assignor is also configured to organize each of the records according to the confidence values. In one embodiment the template builder discards all identifying characteristics below a threshold. As used herein, configured means configured using software, hardware, firmware, any other means of configuring an element, and any combination of these.

The apparatus also includes a biometric sensor coupled to the template builder. The biometric sensor is configured to read a patterned object and extract data corresponding to identifying characteristics. In one embodiment, the biometric sensor is a finger image sensor. In another embodiment, the biometric sensor is a retinal scanner.

Preferably, the apparatus also includes a template library configured to store one or more templates containing records mapping confidence values to identifying characteristics. The apparatus also includes a matcher for matching, in a predetermined manner, identifying characteristics of the patterned object read by the biometric sensor with identifying characteristics in the template library, thereby verifying the patterned object. The predetermined manner includes comparing the identifying characteristics in an order determined by the confidence values.

Preferably, the matcher includes a loose matcher in a first stage and a strict matcher in a second stage. The matcher is configured to increment a confidence value by a first value if the first stage determines a successful match and by a second value, larger than the first value, if the second stage determines a successful match.

The apparatus also includes a host device configured to perform a function based on a successful match between a candidate template and a template within the template library. The host device is a cellular phone, a personal computer, a digital camera, a digital audio player, a digital audio/video player, or a health/monitor device.

In a fifth aspect of the present invention, an apparatus for matching minutiae of a patterned object includes a finger sensor for reading an image of the patterned object; a template builder configured to build templates of minutiae from the image; a storage containing a library of one or more other templates, wherein each of the one or more templates maps confidence values to minutiae from one image of the patterned object, and further wherein the minutiae in the one or more templates have an organization based on the confidence values; and a matcher configured to match any pair of templates based on the organization to thereby verify the patterned object. The apparatus also includes an assignor configured to assign confidence values to minutiae in the one or more templates based on a result of the matches and to organize templates based on the confidence values.

In a sixth aspect of the present invention, a computer-readable medium stores a data structure that includes a plurality of records. Each record includes a first field containing data representing a minutia point and a second field containing data representing a confidence value for the minutia point.

BRIEF DESCRIPTION OF THE DRAWINGS

FIGS. 8A-C show templates after initialization and adjustment steps in accordance with one embodiment of the present invention.

DETAILED DESCRIPTION OF THE DRAWINGS

The present invention is used to validate a patterned object, such as a finger, by matching the identifying characteristics of the patterned object with stored identifying characteristics of the patterned object. Matches are performed based on confidence values associated with the identifying characteristics. For example, those identifying characteristics with the highest confidence values are first matched to identifying characteristics of the read patterned image. In other embodiments, data corresponding to identifying characteristics with low confidence values are deleted, thereby saving memory, always a consideration on portable devices such as cellular telephones, digital cameras, and digital audio players.

Figure 1:
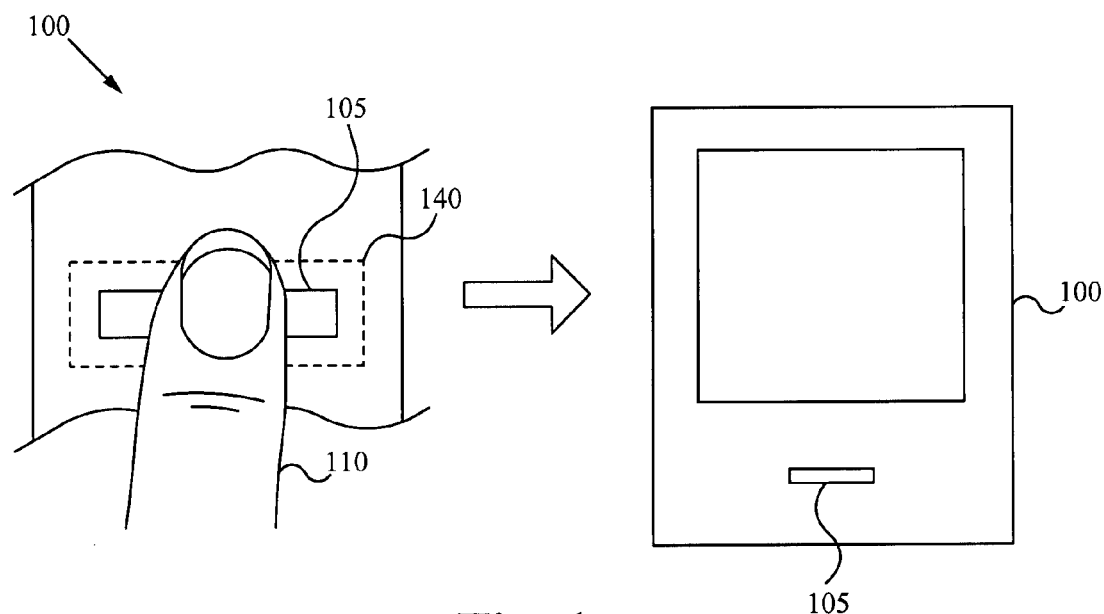
FIG. 1 is a high-level diagram of a system using a fingerprint sensor to verify a user in accordance with one embodiment of the present invention.
Figure 2:
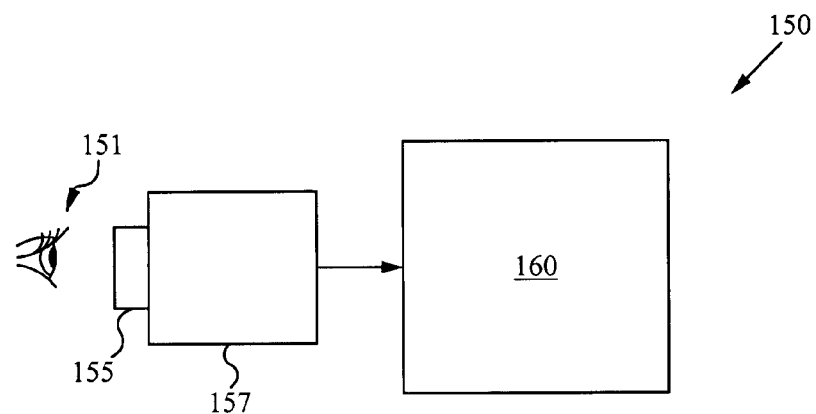
FIG. 2 is a high-level diagram of a system using a retinal scanner to verify a user in accordance with one embodiment of the present invention.

FIG. 1 shows a system 100 in which an image of a finger 110 is verified after the finger 110 is placed on or swiped across a finger sensor 105. The system 100 includes a verification module 140 coupled to the finger sensor 105. As described below, minutiae points from the finger 110 are extracted and matched to minutiae points generated from other scans of the finger 110, generally captured during an enrollment or initialization process. In accordance with the invention, the finger 110 (and hence a user) is verified more quickly, being matched more efficiently, and also using less memory. FIG. 2 shows a system 150 in which an image of a retina, read by a retinal scanner 155, is verified to authorize a user to use the system 160. The retinal scanner 155 is coupled to a verification module 157. Information about retinal minutiae are extracted and matched to similar information generated from previous scans of the retina.

It will be appreciated that patterned images other than fingers and eyes are able to be verified, and identifying characteristics other than retinal minutiae can also be used in accordance with the present invention.

Figure 3:
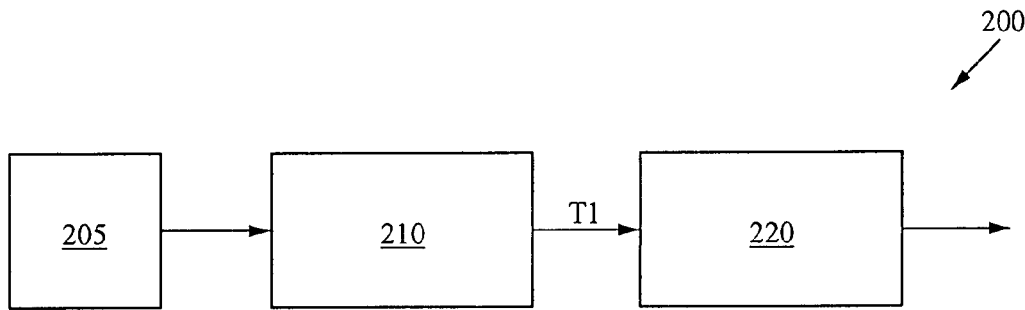
FIG. 3 is a block diagram of a template builder and a matcher in accordance with one embodiment of the present invention.

FIG. 3 is a high-level diagram of a system 200 in accordance with one embodiment of the present invention. The system 200 includes a biometric sensor 205 coupled to a template generator 210, which in turn is coupled to a verification module 220. In operation, the biometric sensor 205 reads a patterned object, such as a fingerprint, to capture an image of the patterned object. The template generator 210 generates a template T1 containing identifying characteristics corresponding to the captured image. The verification module 220 matches the identifying characteristics represented by the information in T1 to identifying characteristics in other templates generated from other images of the patterned object to verify the patterned object. Preferably, the identifying characteristics generated from other images of the patterned object are stored in multiple templates Tmult (not shown). Each of the templates Tmult contains data representing characteristics of one of the other images, as well as records that associate confidences values to corresponding identifying characteristics. The confidence values are updated to reflect more or less confidence in an identifying characteristic.

As one example, an identifying characteristic has a high degree of confidence (a high confidence value) because it is found in more of the patterned images than an identifying characteristic with a smaller confidence value. An identifying characteristic can have a low confidence value because it is associated with a temporary scar that is found in few of the scanned images or was produced by dirt on a sensor from which the patterned image was obtained. In accordance with the present invention, when verifying a scanned image, scanned identifying characteristics are first matched to corresponding identifying characteristics that have high confidence values. In some embodiments, identifying characteristics with low confidence values are not even stored, let alone matched, thereby saving memory and processor time needed to perform matches.

When a number of identifying characteristics above a threshold are successfully matched with stored identifying characteristics, the patterned object, and thus the owner of the patterned object, is verified. This threshold can be set and adjusted using different criteria. As one example, when a user must be verified to perform some low-level task on a computer system, few identifying characteristics must be successfully matched. When a user must be verified to perform a high-level task, more identifying characteristics must successfully match.

Figure 4:
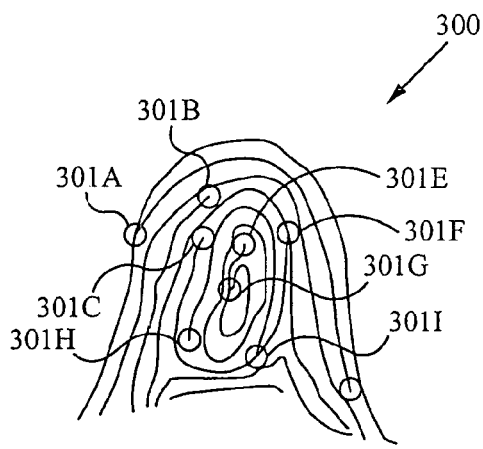
FIG. 4 shows a fingerprint with minutiae points circled.

FIG. 4, used to explain examples below, shows a fingerprint image 300 read by a finger sensor. The fingerprint image 300 contains identifying characteristics used to identify the finger. Here, the identifying characteristics include minutiae points 301A-C and 301E-I, which include ridge endings and bifurcations.

Figure 5:
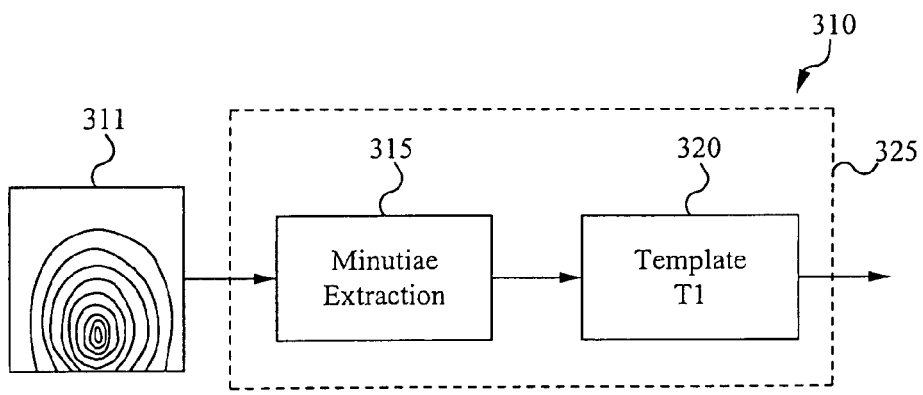
FIG. 5 shows a finger sensor, a minutiae extractor, and a template builder in accordance with one embodiment of the present invention.

FIG. 5 shows a component 310 for capturing fingerprint minutiae and generating a template of minutiae as the identifying characteristics. The component 310 includes a finger sensor 311, such as a finger swipe sensor or a finger placement sensor, coupled to a template generator 325. The template generator 325 includes a minutiae extractor 315, coupled to a template builder 320 for building a template T1. Preferably, the template T1 contains records associating confidence values to data representing minutiae points. The confidence values are initialized and later adjusted (incremented, decremented, or not changed) when the identifying characteristics in the template T1 are matched to identifying characteristics in other templates. In an alternative embodiment, the confidence values are included in a data structure associated with but different from the template T1.

In one embodiment, a minutiae-based matcher is used to compare two or more templates extracted from two or more different scans of the same fingerprint to assign confidence values to each individual minutia point in each template. Minutiae matchers are described in Davide Maltoni, Dario Maio, Anil K. Jain, and Salil Prabhakar, *Handbook of Fingerprint Recognition* (1st ed., Springer 2005), which is hereby incorporated by reference. These minutiae matchers are able to determine whether a minutia point M in template T_view1 is the same physical point as minutia point M' in template T_view2. In fact, the matcher is able to map a subset of minutia points in T_view1 to a subset of the minutia points in T_view2, so that for any given minutia point M in template T_view1, it is known whether a) that point has a corresponding point M' in template T_view2 or b) that point has no known corresponding point. Furthermore, it can be determined whether a point M that does not have a corresponding point M', lies within the bounding box of matched minutiae points in T_view1 or is external to it. A similar analysis is performed for all minutiae points in T_view2. Fingerprint matchers are discussed in more detail in U.S. Pat. No. 6,546,122, titled "Method for Combining Fingerprint Templates Representing Various Sensed Areas," to Russo, and U.S. Pat. No. 6,681,034, titled "Method and System for Fingerprint Template Matching," to Russo, both of which are hereby incorporated by reference.

Figure 6A:
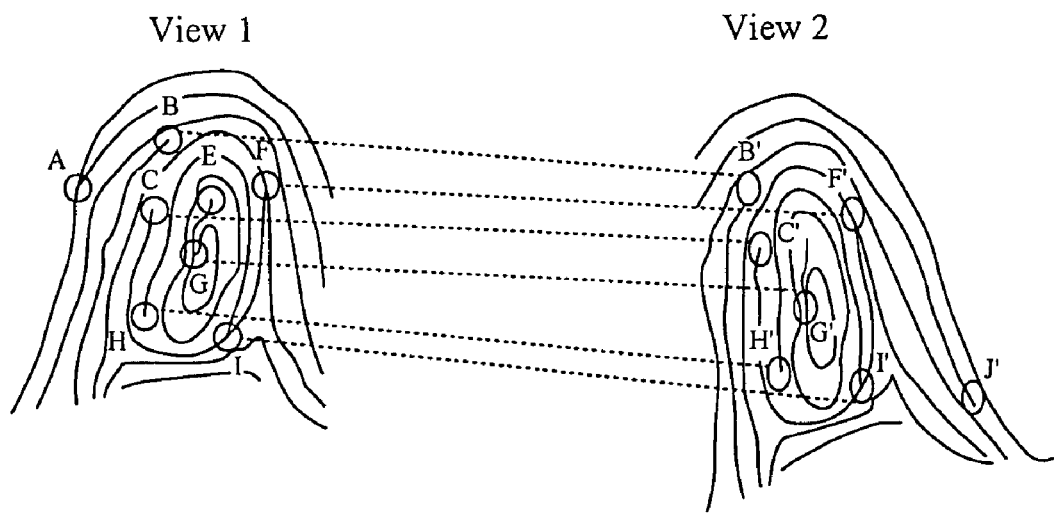
FIG. 6A shows a pair of matching fingerprints in two views, with lines drawn between corresponding minutiae in both views.

FIG. 6A shows two different views, View 1 and View 2, of a fingerprint image. Preferably, the different views are represented by data in templates generated from different scans of the same finger. FIG. 6A shows how to determine whether a minutia point in view 1 (e.g., point B) has a corresponding minutia point in view 2 (e.g., point B'). As explained below, this correspondence determines whether and how a confidence value for a minutia point is adjusted. For example, if a minutia point in one view (e.g., point B in View 1) has a corresponding minutia point in another view (e.g., point B' in View 2), then the confidence value for the minutiae (in both views) is increased. Otherwise, it is not.

As described in more detail below, confidence values are also adjusted depending on the location of minutiae: those within a bounding box are adjusted by a larger increment than those outside the bounding box. A bounding box is used for many reasons, such as tailoring processing and simplifying the matching algorithm, thus decreasing the amount of processing that must be performed during a match.

Figure 6B:
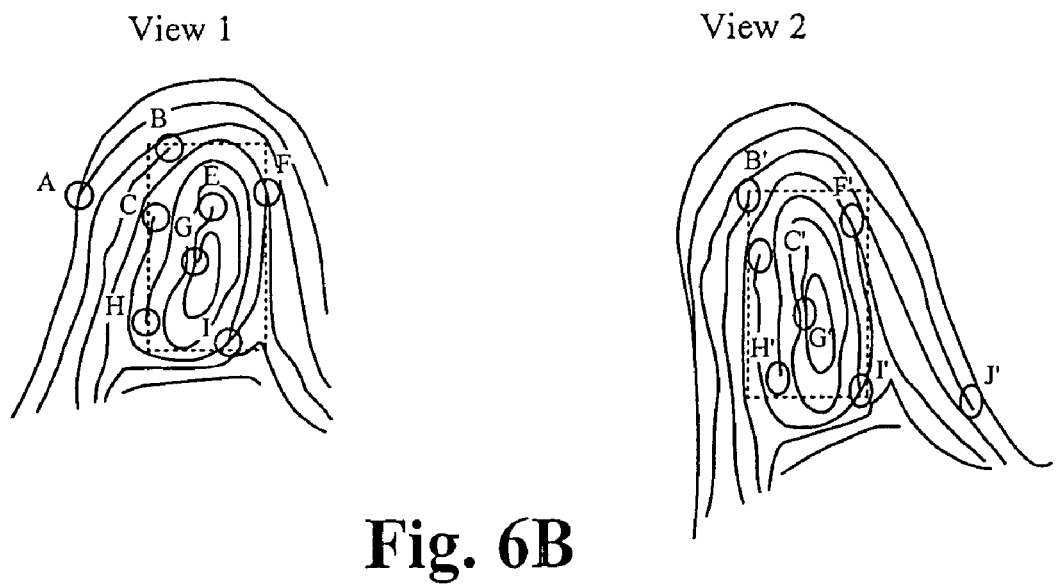
FIG. 6B shows bounding boxes for both views in FIG. 6A.

FIG. 6A also shows that the minutiae points B, C, F, G, H, and I in View 1 all have corresponding minutiae points B', C', F'G', H' and I' in View 2. FIG. 6B shows View 1 and View 2 from FIG. 6A, but with a predetermined bounding box in each view.

For all minutiae contained in T_view1 and T_view2, confidence values are assigned and updated as follows:
  a confidence value is incremented by C_noMatch if the minutia point is neither successfully matched nor external to the bounding box
  a confidence value is incremented by C_matchFinal if the minutia point is successfully matched
  a confidence value is incremented by C_external if the minutia point lies outside the bounding box of final matched minutia point locations The bounding box in the preferred embodiment is defined as the rectangle that minimally encloses all the matched minutia points. Those skilled in the art will appreciate that other definitions are possible, including ones where the rectangle is rotated, translated, or otherwise oriented to match the angle of rotation between the two fingerprints and another in which a trapezoid or other polygonal shape is used to enclose the matched points.

If a minutia point is not successfully matched but lies outside the bounding box, it likely had no chance to successfully match because it came from a part of the finger that did not overlap with the image it was being matched to. Therefore it is not penalized.

Referring to FIG. 6B, assuming all minutiae points start with a confidence value of 0, after the confidence assignment process, the confidences of each minutia are shown in Table 1.

TABLE 1

| T_view1 | | T_view2 | |
| --- | --- | --- | --- |
| Name | Confidence Value | Name | Confidence Value |
| A | C_external | | |
| B | C_matchFinal | B' | C_matchFinal |
| C | C_matchFinal | C' | C_matchFinal |
| E | C_noMatch | | |
| F | C_matchFInal | F' | C_matchFinal |
| G | C_matchFinal | G' | C_matchFinal |
| H | C_matchFinal | H' | C_matchFinal |
| I | C_matchiFinal | I' | C_matchFinal |
| | | J' | C_external |

In a preferred embodiment, a matcher has two stages. The first stage uses looser tolerances to match the minutiae points, followed by a second final stage that uses more stringent (e.g., stricter or tighter) tolerances. The first stage is less likely to omit a minutia point that should have successfully matched, so therefore it adds some information to the confidence. It is also possible to run a single-stage matcher twice with different parameter settings—one loose and one tighter—to get similar results. It will be appreciated by those skilled in the art that any number of stages and parameter settings, alone or combined, can be used to generate finer granularity in the confidence values, as could numerous matching metrics such as match error that can be calculated on a per-minutia basis. In the latter case, the confidence increments C_external, C_matchFinal, and C_noMatch are not fixed constants.

In all of these cases the bounding box is still defined as a rectangle that minimally encloses the final matched minutia points. However, in alternative embodiments the bounding box is defined by those minutiae points that passed the first stage instead of the final one. Or, different bounding boxes are used based on the results of executing each stage and/or parameter setting.

In a preferred embodiment, for all minutiae contained in T_view1 and T_view2, confidence values are assigned as follows:
  a confidence value is incremented by C_noMatch if the minutia point is not successfully matched in stage or the final stage nor is external to the bounding box
  a confidence value is incremented by C_matchStage1 if the minutia point is successfully matched in the first stage
  a confidence value is incremented by C_matchFinal if the minutia point is successfully matched in the final stage
  a confidence value is incremented by C_external if the minutia point lies outside the bounding box In one embodiment C_noMatch=0, C_external=2, C_matchStage1=8 and C_matchFinal=32. These incremental values represent the relative importance of each stage and property. However, other values and weightings are possible, including values less than zero.

The process is able to be repeated for multiple templates simply by matching more templates to each other and assigning the confidence values as shown above. For instance, if a pool of three templates T_view1, T_view2 and T_view3 instead of just two are available, all confidence values are set to zero and then all possible pairs of templates are run through the confidence assignment as follows, in any order:
  T_view1 with T_view2
  T_view1 with T_view3
  T_view2 with T_view3

More generally, all pairwise combinations are performed for all N templates. Given a large enough pool it could be advantageous to skip some pairs to save computer resources. It is possible to assign confidence values at a given time—most likely during the enrollment process—and then modify (adjust) them using additional template data captured at a later date—most likely during subsequent verification attempts.

In an alternative embodiment, the minutia confidence adjustment technique described above is used in conjunction with prior art minutia confidence methods to form a hybrid method that could be more accurate than either technique alone. In yet another alternative embodiment, the minutia confidence adjustment technique is applied to only enrollment templates and prior art techniques are used on templates acquired during verification, where only a single template might be available.

Figure 7:
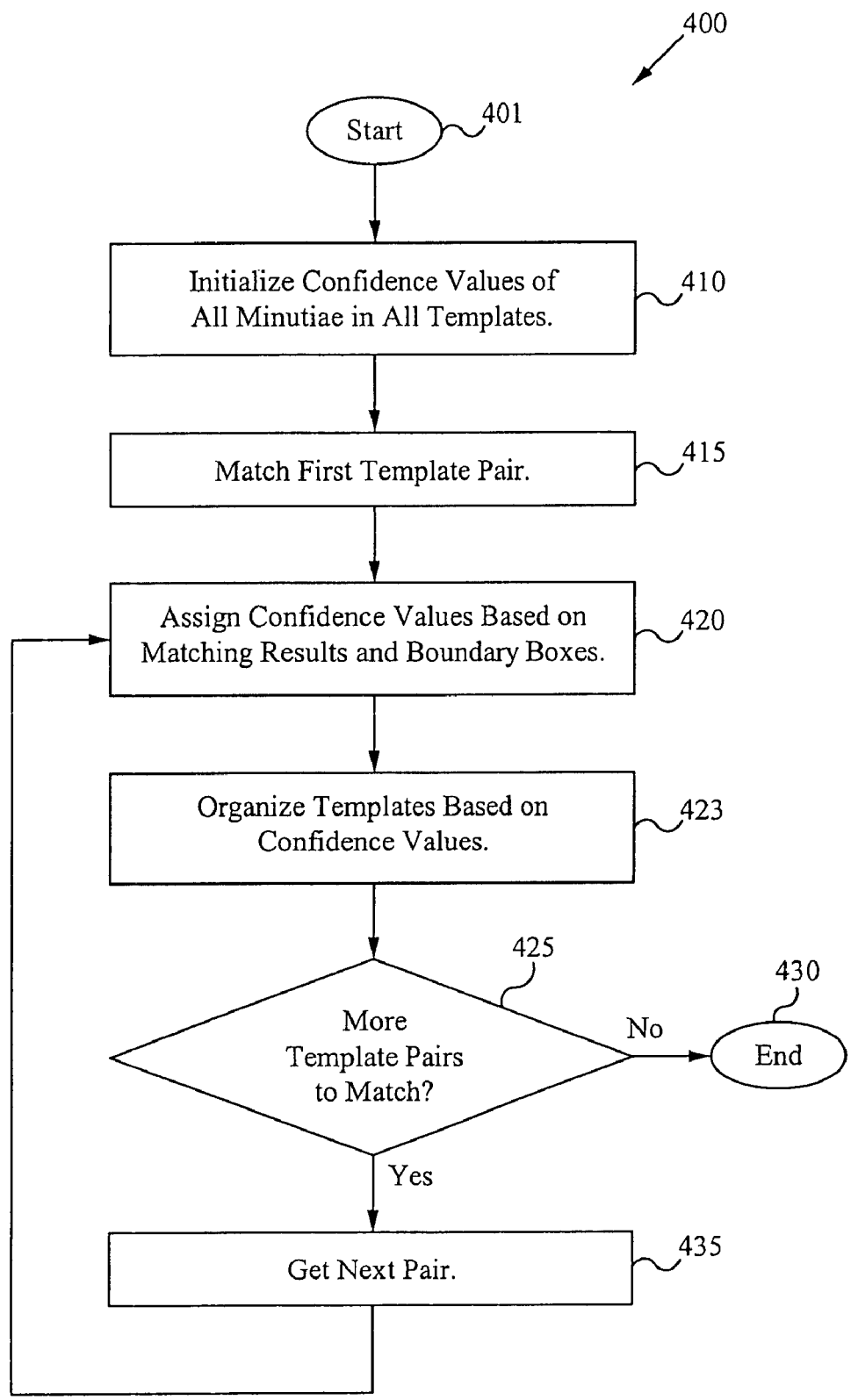
FIG. 7 is a flow chart of the steps of a process for assigning minutiae confidence values in accordance with one embodiment of the present invention.

FIG. 7 is a flow chart of the steps 400 for building one or more templates in accordance with one embodiment of the present invention. The process starts in the step 401. Next, in the step 410, the confidence values of all minutiae in all templates are initialized to a value, such as 0. Next, in the step 415, the first pair of templates are matched, and in the step 420, confidence values are assigned based on matching results and boundary boxes, such as described above. In the step 423, the templates are organized in accordance with the present invention, such as by ranking the minutiae based on their confidence values, ordering the minutiae based on their confidence values, pruning the minutiae based on their confidence values, or any combination of these. In the step 425, it is determined whether there are more minutiae template pairs to match. If there are no more, the process proceeds to the step 430, where it ends. Otherwise, the process proceeds to the step 435, where the next pair of templates are retrieved, and then loops back to the step 420.

Figure 8A:
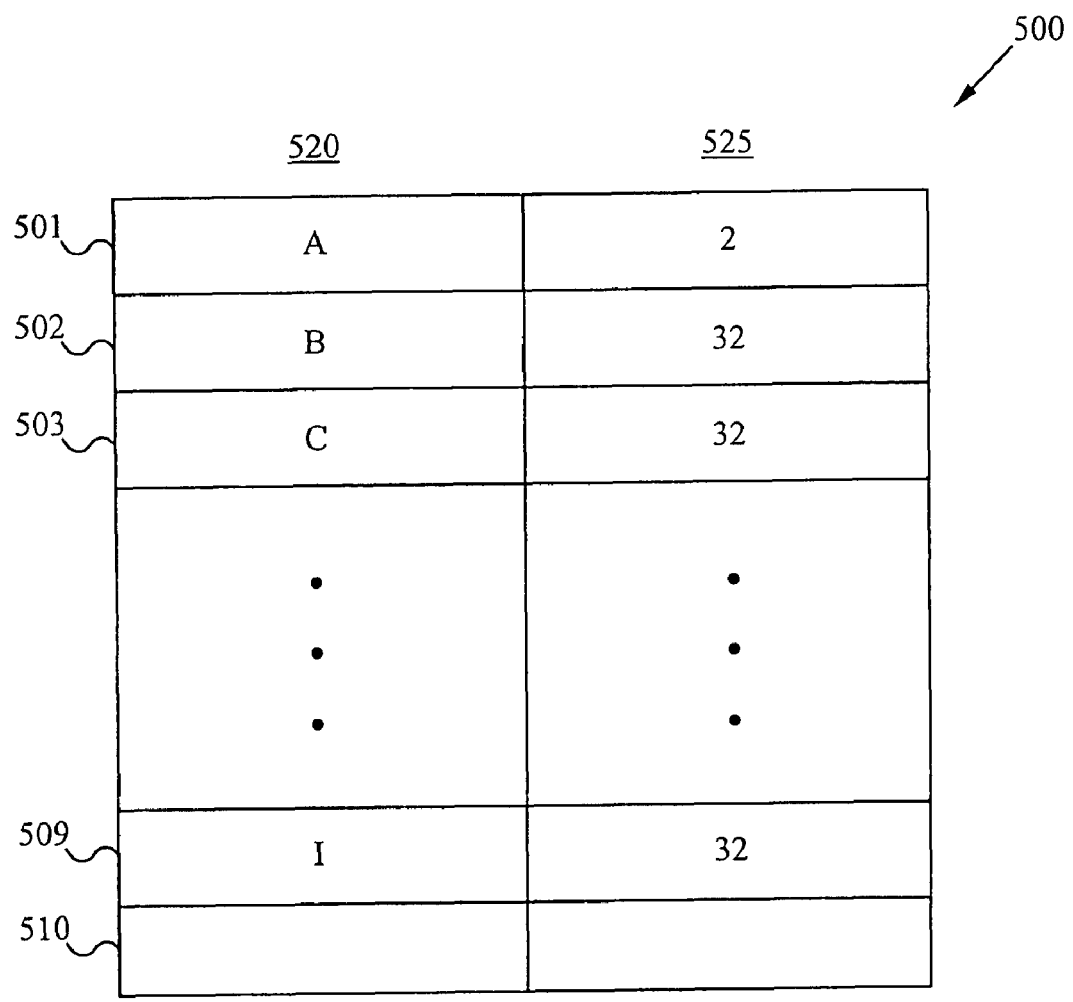

FIG. 8A shows a template 500 for View 1 of FIG. 6A, generated after matching the templates for View 1 and View 2. The template 500 includes a column 520 of minutiae points (e.g., data representing the minutiae points), a column 525 of corresponding confidence values, and rows or records 501-510 of minutiae points and corresponding confidence values. The exemplary row 501 shows that the minutia point A (column 520) has a corresponding confidence value of 2 (column 525), and the row 502 shows that the minutia point B (column 520) has a confidence value of 32 (column 525). Confidence values in the other rows are similarly explained.

Figure 8B:
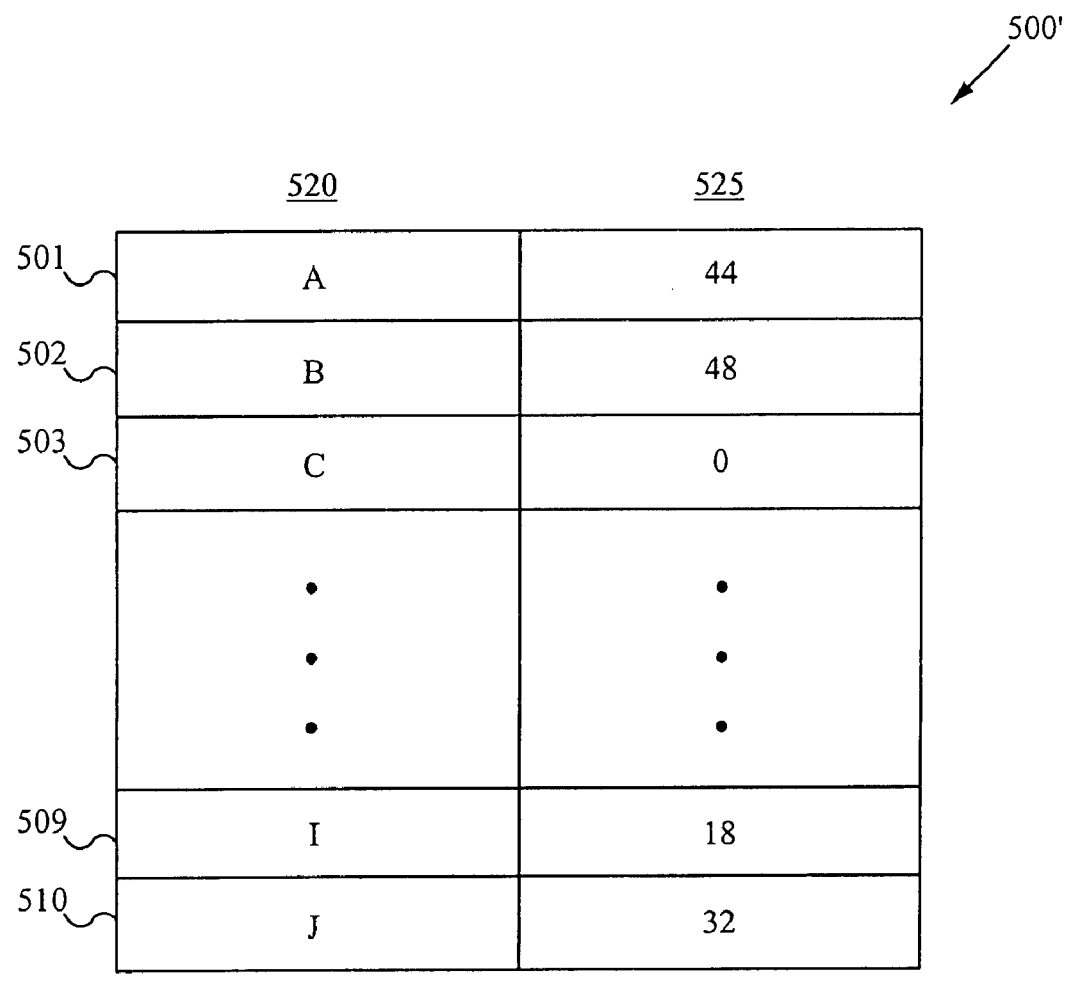

FIG. 8B shows the template 500 after it has been matched with templates corresponding to other images (e.g., other views) of the patterned object so that the confidence values are adjusted to update the template 500 to produce the template 500'. As for all figures in the application, like components are designated by like numerals. FIG. 8B shows that the minutia point A has a confidence value of 44 (row 501, column 525), the minutia point B has a confidence value of 48 (row 502, column 525), the minutia point C has a confidence value of 0 (row 503, column 525), etc.

In operation, when a fingerprint image is to be verified, the records in the "candidate" template generated when the finger is scanned are matched to the records in the template 500. The scanned (candidate) minutiae points are matched to the minutiae points in the template 500 to determine whether sufficient minutiae points between the two successfully match. The template 500' is considered to reflect minutiae of an authentic finger image. The candidate minutiae are first matched to the minutiae in the template 500', and if a number of minutiae points above a threshold successfully match, the scanned finger is verified. Generally, the records are compared sequentially, which means that some minutiae with low confidence values are matched before minutiae with higher confidence values are matched. This is inefficient since the verification process can be performed more quickly by matching minutiae that are more likely in both templates. Moreover, the entire template 500' is stored in memory. And because a system can store many templates, each containing many minutiae points, memory is wasted.

Figure 8C:
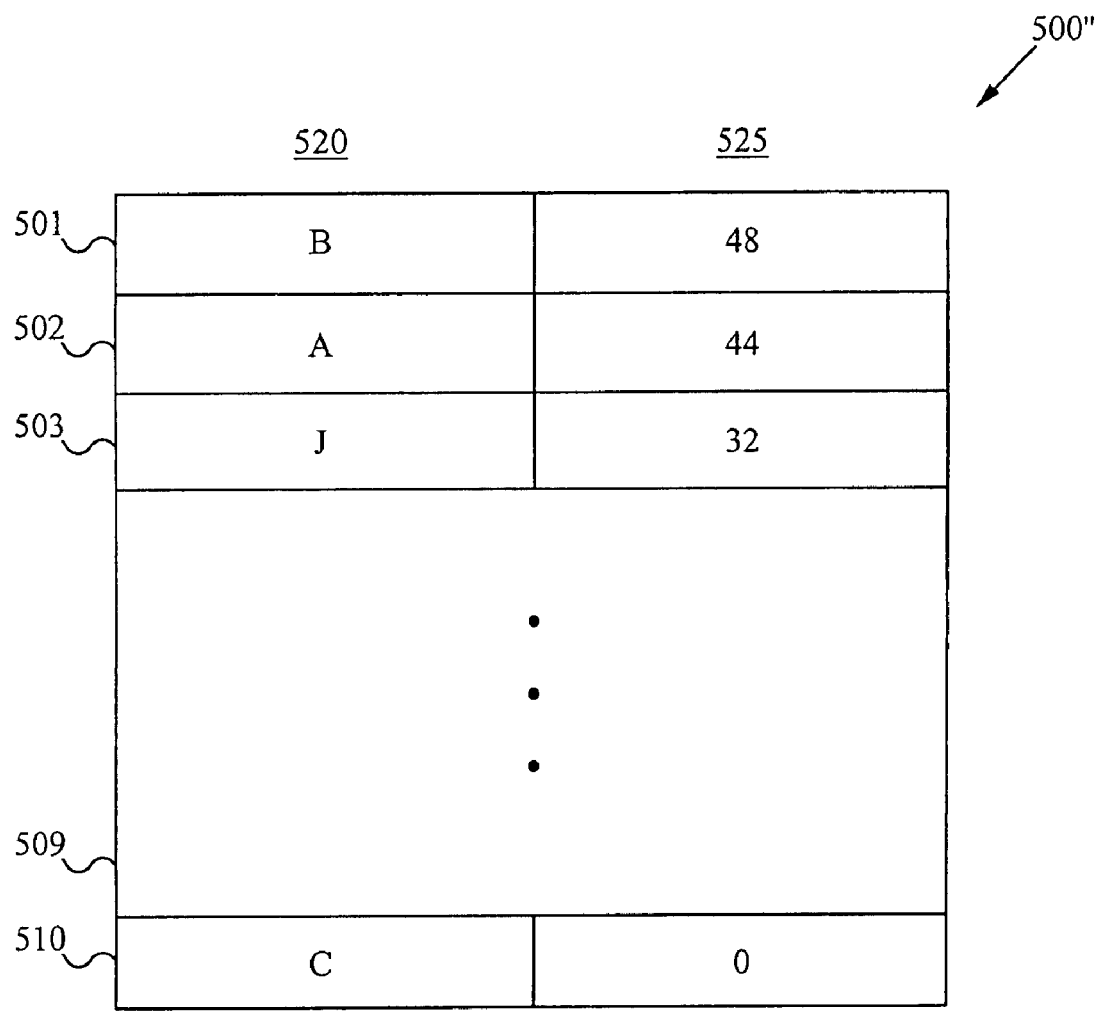

In accordance with the present invention, the template 500' is reorganized to produce the template 500" in FIG. 8C. The template 500" has been reorganized so that minutiae points are ordered according to their confidence values, from highest to lowest. Thus, the minutia point B, with the highest confidence value of 48, is ordered highest, in the row 501. The minutia point A, with the second highest confidence value of 44, is ordered next, in the row 502, etc.

Preferably, the template 500" is also pruned so that minutiae points with a confidence value below a threshold are deleted from the template 500", thereby saving memory. For example, if a pruning threshold is 10 and the minutiae points C, D, and F all have confidence values less than 10, then records for all of these minutiae points are deleted from the table 500".

In the preferred embodiment, pruning is done by ordering the minutiae by confidence and truncating the lowest confidence points or just enough so as not to exceed the system's maximum minutiae requirement, if there is one. Each template is pruned separately. In alternative embodiments, pruning is performed based on additional factors as well as confidence value, including ways that maximize coverage of the physical surface area of the fingerprint represented by the templates (e.g., T_view1, T_view2, etc, described in relation in FIGS. 6A and 6B) that are available to verify against.

The pruning threshold can be static, such as determined during an initialization step, or it can be dynamic, such as based on the available memory in the system. When the available memory is limited, the threshold can be increased so that smaller templates are stored in memory. The threshold can also be set based on a security level of a system. For lower security levels, the threshold is higher, so that fewer minutiae points need to be matched. Templates are correspondingly smaller.

In another embodiment, a threshold can also be determined by a sum of confidence values. In this embodiment, confidence values are added, so that the sum of the confidence values in the stored templates is at or near a predetermined threshold. Thus, if the threshold is 80, minutiae points whose confidence values sum to 80 are stored. All other minutiae points are deleted. This threshold can be increased when more scans are performed. In this way, minutiae points are stored based on the relative values of the confidence values, not just the overall sum.

In other words, no matter how many scans are performed, if the relative confidence values remain unchanged, the size of the template also remains unchanged. In this embodiment, again, the threshold is dynamic. It will be appreciated that other pruning algorithms are possible in accordance with the present invention.

Figure 9:
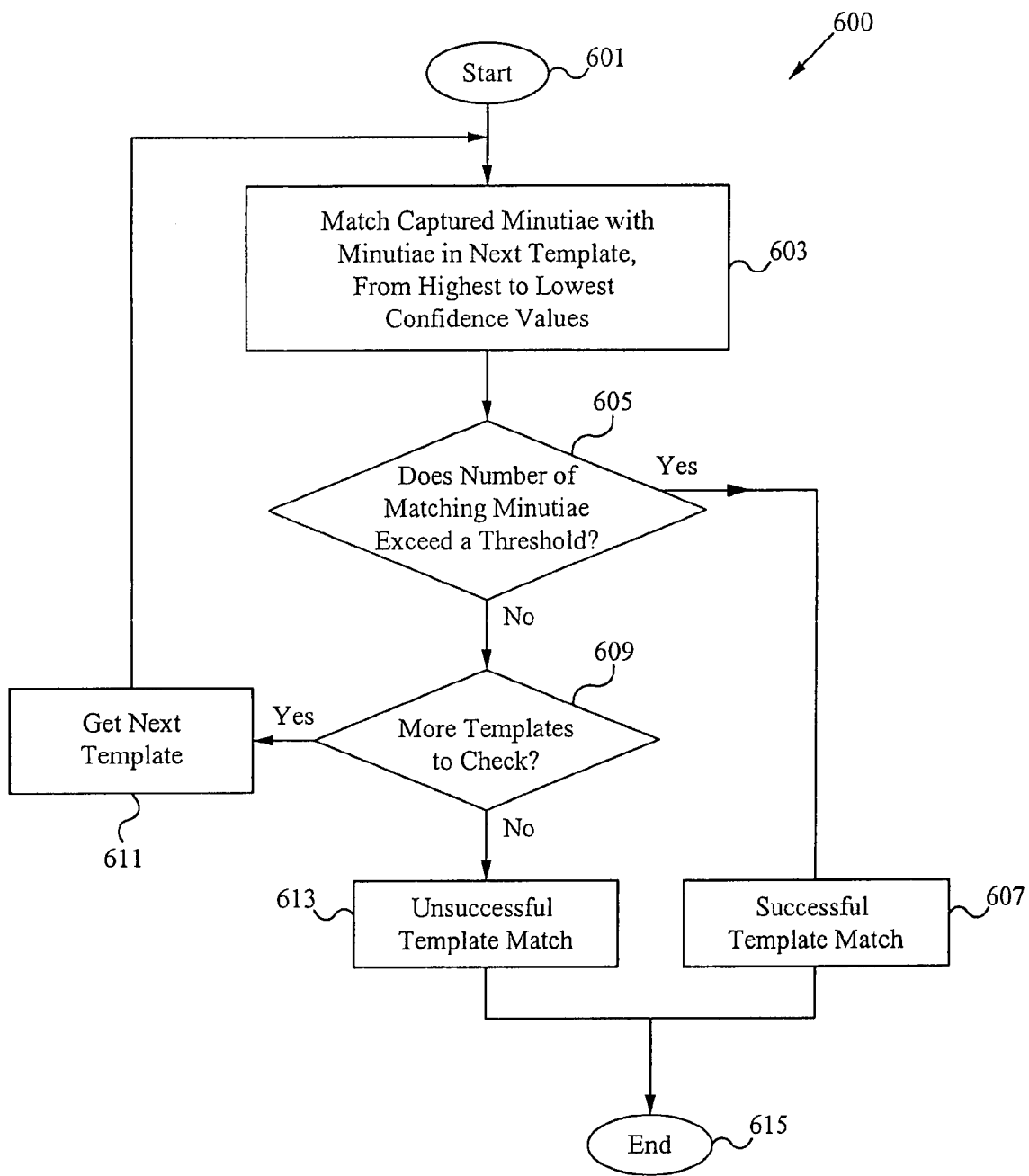
FIG. 9 is a flow chart of the steps of a process for verifying a user in accordance with one embodiment of the present invention.

FIG. 9 is a flow chart of the steps 600 for verifying a scanned fingerprint, such as by using a verification module in accordance with the present invention. The system is initialized in the start step 601. Next, in the step 603, a "candidate" template is generated, such as described above, from the captured fingerprint image and matched to the next template in a library of templates. In the first iteration, the "next" template is the first template stored. Preferably, the minutiae points in the next template are organized in accordance with the present invention. Thus, preferably, when the minutiae points in the candidate template are matched sequentially with the minutiae points in the candidate template, the minutiae points are matched from highest to lowest confidence values, using a minimum (pruned) set of minutiae with acceptable confidence values. In the step 605, if a threshold number of minutiae points in the candidate template and the next template successfully match (e.g., the templates successfully match), the process proceeds to the step 607, generating a "Successful Template Match" ("Verified") result, and then to step 615, where the process ends.

If, in the step 605, a threshold number of minutiae do not successfully match, the process continues to step 609, in which it is determined whether there are more templates in the template library to check. If there are no more templates in the template library, the process proceeds to the step 613, in which the process generates an "Unsuccessful Template Match" ("Verification failed") result, and then on to step 615. If, in the step 609, it is determined that there are more templates in the template library to check, the process proceeds to the step 611, in which the next template is retrieved, and the process then loops back to the step 603.

It will be appreciated that while the discussion above describes a template corresponding to an image of a single patterned object, templates of multiple patterned objects can also be used in accordance with the present invention. For example, the present invention can be used to verify different fingers of a single user or fingers of different users.

Figure 10:
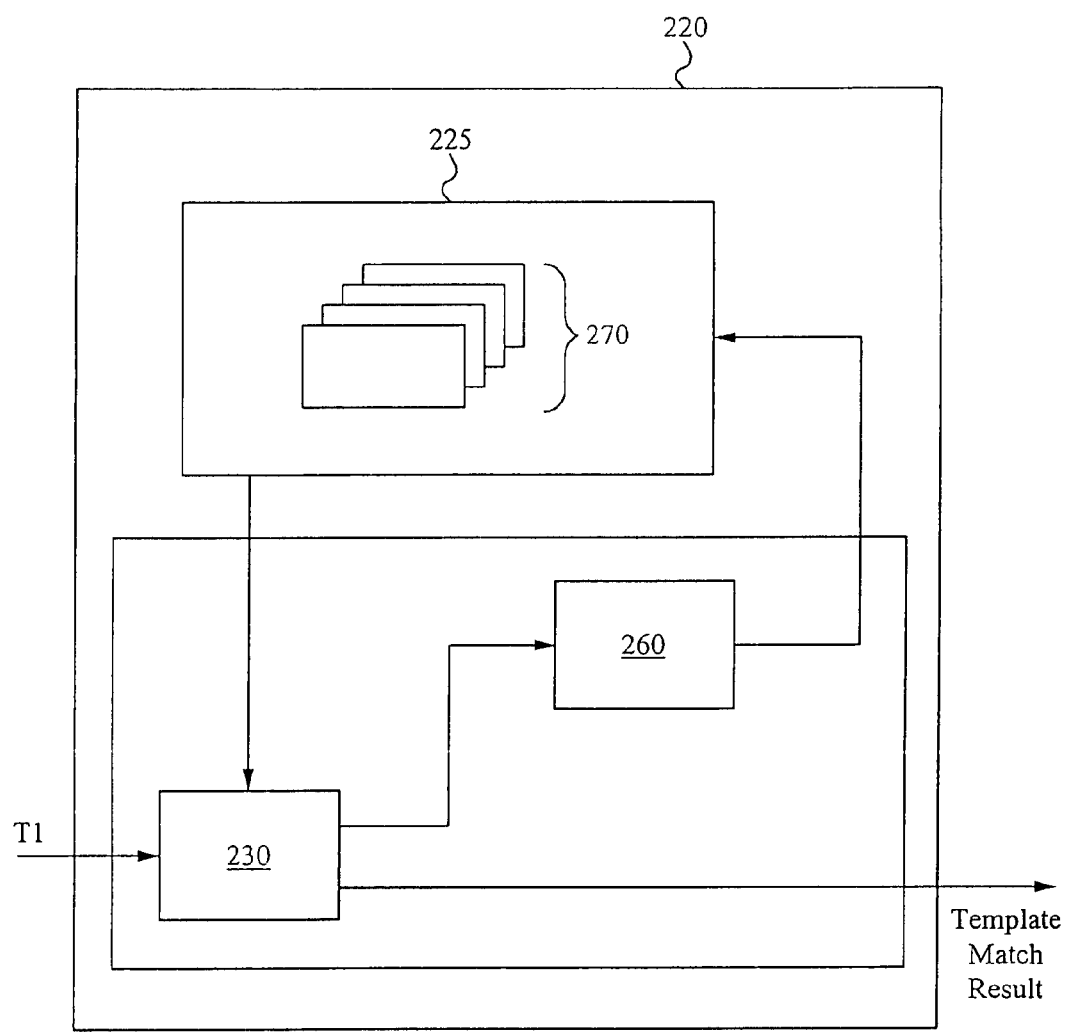
FIG. 10 is a high-level block diagram of a template matcher in accordance with one embodiment of the present invention.

FIG. 10 is a block diagram of components of the verification module 220 of FIG. 3. The verification module 220 includes an input to receive the template T1. The verification module 220 includes a matcher 230, configured to match templates of minutiae and update confidence values, such as discussed above. The matcher 230 receives templates 270 from a template library 225 stored in a computer-readable medium and matches the templates in the template library 225 to the template T1. The matcher 230 has a first output coupled to a confidence adjustor 260, which uses the results of the matches to adjust confidence values in the templates. The confidence adjustor 260 organizes the templates based on the confidence values and outputs the organized templates back to the template library 225. The matcher 230 has a second output on which it generates a "Template Match Result" (successful or unsuccessful), such as discussed in FIG. 9, used to verify a patterned object, such as a finger.

Preferably, the confidence adjustor 260 is the same component as a confidence assignor, discussed elsewhere. The single element assigns values during system initialization and adjusts those values later, whenever additional images of a biometric object are scanned. In some embodiments, the single element is referred to as either a confidence adjustor or a confidence assignor, depending on which step of the process (initialization or updating) is being performed. In other embodiments, the confidence adjustor and the confidence assignor are different elements.

Figure 11A:
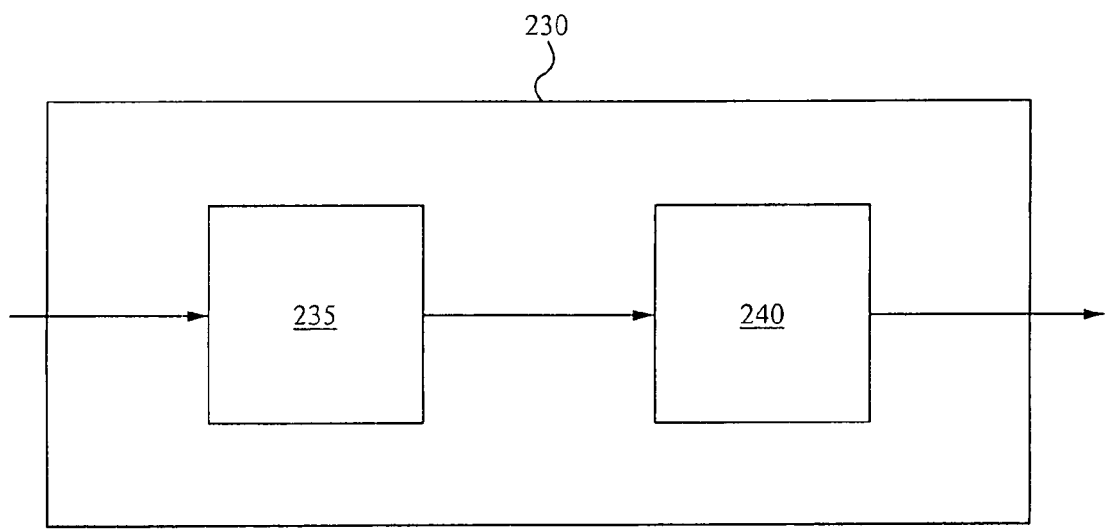
FIGS. 11A and 11B are high-level block diagrams of a matcher in accordance with different embodiments of the present invention.

FIG. 11A shows the matcher 230 of FIG. 10 in accordance with one embodiment of the present invention. The matcher 230 includes a first stage 135 coupled to a second stage 240. Preferably, the first stage 235 is a loose matcher, which uses loose tolerances to perform a match, and the second stage 240 is a strict matcher, which uses tighter tolerances to perform a match.

Figure 11B:
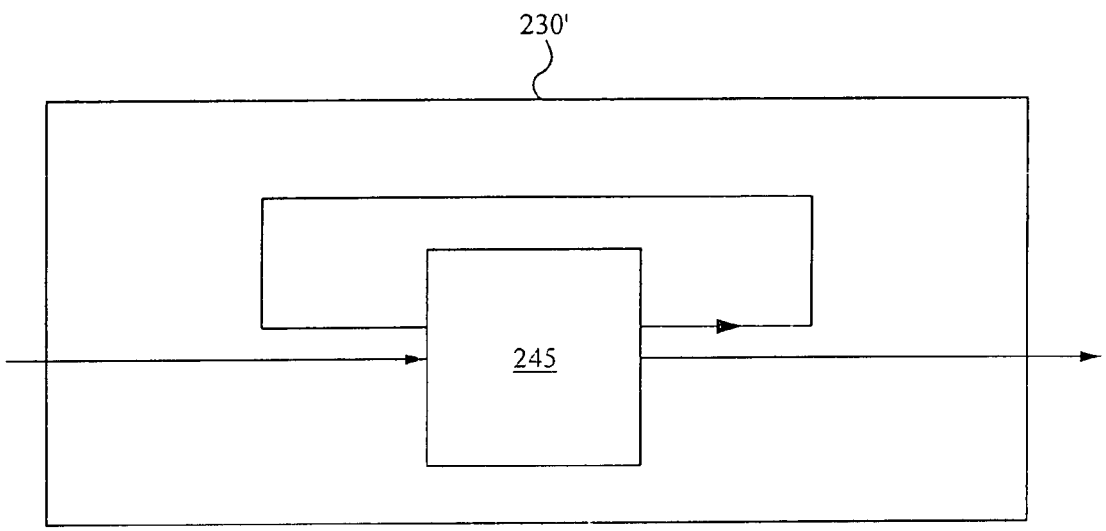

FIG. 11B shows a matcher 230' in accordance with another embodiment of the present invention. The matcher 230' includes a single stage 245 that uses a feedback loop to match templates in multiple passes. Preferably, the first pass performs loose matches and the second and later passes use increasingly stricter matches.

In operation of one embodiment of the present invention, multiple scans of finger images are taken. Corresponding templates from each scan are generated and stored in a template library. Preferably, the multiple scans are taken of the finger at different orientations-rotated along different axis, rolled, etc.—so that when the finger is later scanned for verification, regardless of its orientation, a corresponding template exists. The templates are matched to one another, using pairwise matches, and confidence values are determined for each minutiae in each template. The templates are organized so that they take up less memory and so that they can be later matched to other templates more quickly. Preferably, the multiple scans are performed during an orientation or initialization step.

The templates are later used to verify a user's identity. The user places her finger on or swipes her finger across a finger sensor. A candidate template is generated from this scan and matched to the templates in the template library. The matches are performed based on the organization of the templates in the template library. A user is verified only if a successful match is made between the candidate template and a template in the template library. In some embodiments, the candidate template is added to the template library. Once verified, the user can access a system or perform a specific function on the system, such as access a protected file or launch a specific program.

While the discussions above have focused on fingerprint sensors, it will be appreciated that the invention can be used to verify other biometric objects such as retinas, using identifying characteristics such as retinal minutiae, and palmprints. Those skilled in the art will recognize that the invention can be modified in many ways. For example, a template in accordance with the present invention can point to a different data structure in which identifying characteristics are actually stored. In this way, the template will contain elements that correspond to the identifying characteristics. It is these elements that can be ranked, ordered, or deleted in accordance with the present invention.

It will also be appreciated that the steps shown above to illustrate embodiments of the invention can be modified in many ways in accordance with the invention. For example, some steps can be added, some steps can be deleted, and the steps can be performed in orders different from those shown.

It will be readily apparent to one skilled in the art that other modifications may be made to the embodiments without departing from the spirit and scope of the invention as defined by the appended claims.

We claim:

1. A method of organizing identifying characteristics of a patterned object used to verify the patterned object, the method comprising:
    matching identifying characteristics of the patterned object in at least one set with identifying characteristics of the patterned object in a candidate set, wherein the matching includes a loose matching stage and a strict matching stage; and
    adjusting a confidence value of each identifying characteristic in the at least one set based on results of the matching, wherein the confidence value is increased by a first value if a match occurs in the loose matching stage and by a second value larger than the first value if a match occurs in the strict matching stage.

2. The method of claim 1, further comprising organizing the at least one set based on the confidence values.

3. The method of claim 2, wherein organizing the at least one set comprises ordering the identifying characteristics in the at least one set based on the confidence values.

4. The method of claim 2, wherein organizing the at least one set comprises deleting from the at least one set any identifying characteristics with a confidence value below a threshold.

5. The method of claim 4, wherein the threshold is predetermined.

6. The method of claim 4, wherein the threshold is dynamic.

7. The method of claim 1, wherein the identifying characteristics are fingerprint minutiae and the candidate set and the at least one set each forms a template of fingerprint minutiae.

8. The method of claim 1, wherein the identifying characteristics correspond to retinal minutiae and the candidate set and the at least one set each forms a template corresponding to retinal minutiae.

9. The method of claim 1, further comprising including the candidate set in the at least one set.

10. An apparatus for assigning confidence values to identifying characteristics of a patterned object comprising:
    a template builder configured to build templates of identifying characteristics, wherein each template contains a record mapping of a confidence value to an associated identifying characteristic; and
    an assignor configured to assign a confidence value to each of the identifying characteristics generated from a loose match and strict match of the identifying characteristics in a template to identifying characteristics of the patterned object in at least one other template, wherein the confidence value of a characteristic is based on whether the loose match and the strict match are made between corresponding ones of the identifying characteristics in the patterned object and the template.

11. The apparatus of claim 10, wherein the assignor is further configured to organize each of the records according to the confidence values.

12. The apparatus of claim 11, wherein each of the records is organized by ordering the record based on an associated confidence value.

13. The apparatus of claim 11, wherein each of the records is organized by deleting any records having a confidence value below a threshold.

14. The apparatus of claim 10, further comprising a biometric sensor coupled to the template builder and configured to read a patterned object and extract data corresponding to identifying characteristics.

15. The apparatus of claim 14, wherein the biometric sensor comprises a finger image sensor and wherein the identifying characteristics are finger image minutiae.

16. The apparatus of claim 14, wherein the biometric sensor comprises a retinal scanner, and wherein the identifying characteristics include retinal minutiae.

17. The apparatus of claim 10, further comprising a template library configured to store at least one template containing records mapping confidence values to identifying characteristics.

18. The apparatus of claim 14, further comprising a matcher for matching in a predetermined manner identifying characteristics of the patterned object read by the biometric sensor with identifying characteristics in the template library to thereby verify the patterned object.

19. The apparatus of claim 18, wherein the predetermined manner comprises matching the identifying characteristics in an order determined by the confidence values.

20. The apparatus of claim 18, wherein the matcher comprises a first stage and a second stage.

21. The apparatus of claim 20, wherein the first stage performs the loose match and the second stage performs the strict match.

22. The apparatus of claim 21, wherein the matcher is configured to increment a confidence value by a first value if the first stage determines a successful match and by a second value, larger than the first value, if the second stage determines a successful match.

23. The apparatus of claim 17, further comprising a host device configured to perform a function based on a successful match between a first template of identifying characteristics and a template in the template library.

24. The apparatus of claim 23, wherein the host device comprises at least one of a cellular phone, a personal computer, a digital camera, a digital audio player, a digital audio/video player, and a health/monitor device.

25. An apparatus for assigning confidence values to identifying characteristics of a patterned object comprising:
   means for building templates of identifying characteristics, wherein each template contains a record mapping of a confidence value to an associated identifying characteristic; and
   means for assigning a confidence value to each of the identifying characteristics generated from a loose match and strict match of the identifying characteristics in a template to identifying characteristics of the patterned object in at least one other template, wherein the confidence value of a characteristic is based on whether the loose match and the strict match are made between corresponding ones of the identifying characteristics in the patterned object and the template.

26. The method of claim 1, wherein adjusting the confidence value comprises increasing the confidence value by increasingly larger values if the match occurs outside a bounding box containing matching minutia, inside the bounding box in the looser matching stage, and inside the bounding box in the strict matching stage, respectively.

27. The method of claim 6, wherein the threshold is dynamically altered based on at least one of available memory on a host system, a security level of an application executing on the host system, and a number of finger images scanned on the host system.

* * * * *